United States Patent [19]
Pinelli et al.

[11] Patent Number: 4,530,576
[45] Date of Patent: Jul. 23, 1985

[54] FIXED REFRACTOR OF ASYMMETRICAL PROFILE IDEAL FOR CONCENTRATING SOLAR ENERGY ON A SUITABLE COLLECTING SURFACE

[75] Inventors: Tazio Pinelli, Pavia; Francesco Sebastiano, Termoli, both of Italy

[73] Assignee: Societa' Italiana Vetro - SIV - S.p.A., Vasto, Italy

[21] Appl. No.: 375,092

[22] Filed: May 5, 1982

[30] Foreign Application Priority Data

May 19, 1981 [IT] Italy .................. 21810 A/81

[51] Int. Cl.³ .............................................. G02B 3/08
[52] U.S. Cl. .................................................. 350/452
[58] Field of Search ......................................... 350/452

[56] References Cited

U.S. PATENT DOCUMENTS

| | | |
|---|---|---|
| 2,290,100 | 7/1942 | Goris . |
| 3,064,125 | 11/1962 | Gott .................. 350/452 |
| 3,797,915 | 3/1974 | Land et al. .......... 350/452 |
| 4,011,857 | 3/1977 | Rice . |
| 4,204,881 | 5/1980 | McGrew . |
| 4,307,711 | 12/1981 | Doundoulakis . |

FOREIGN PATENT DOCUMENTS

| | | |
|---|---|---|
| 0050237 | 4/1982 | European Pat. Off. . |
| 2394766 | 12/1979 | France . |
| 0602171 | 5/1948 | United Kingdom . |
| 0969020 | 9/1964 | United Kingdom . |

OTHER PUBLICATIONS

Burgess et al., Optical Engineering, 17(3), p. 299, (May–Jun. 1978).
Sletten et al., Applied Optics, 19(9), p. 1439–1453, (May 1980).
Hofmann et al., Jenaer Rundschau, pp. 287–295, (1966).

*Primary Examiner*—John K. Corbin
*Assistant Examiner*—Rebecca D. Gass
*Attorney, Agent, or Firm*—Wenderoth, Lind & Ponack

[57] ABSTRACT

There is provided a stationary optical longitudinal refractor for concentrating solar radiation which comprises at least two dioptric elements having different focal points such that the refractor is capable of concentrating solar energy striking it onto an absorber of a subtially smaller area than the exposed area of said refractor, with a concentration ratio equal to or greater than 2.

8 Claims, 7 Drawing Figures

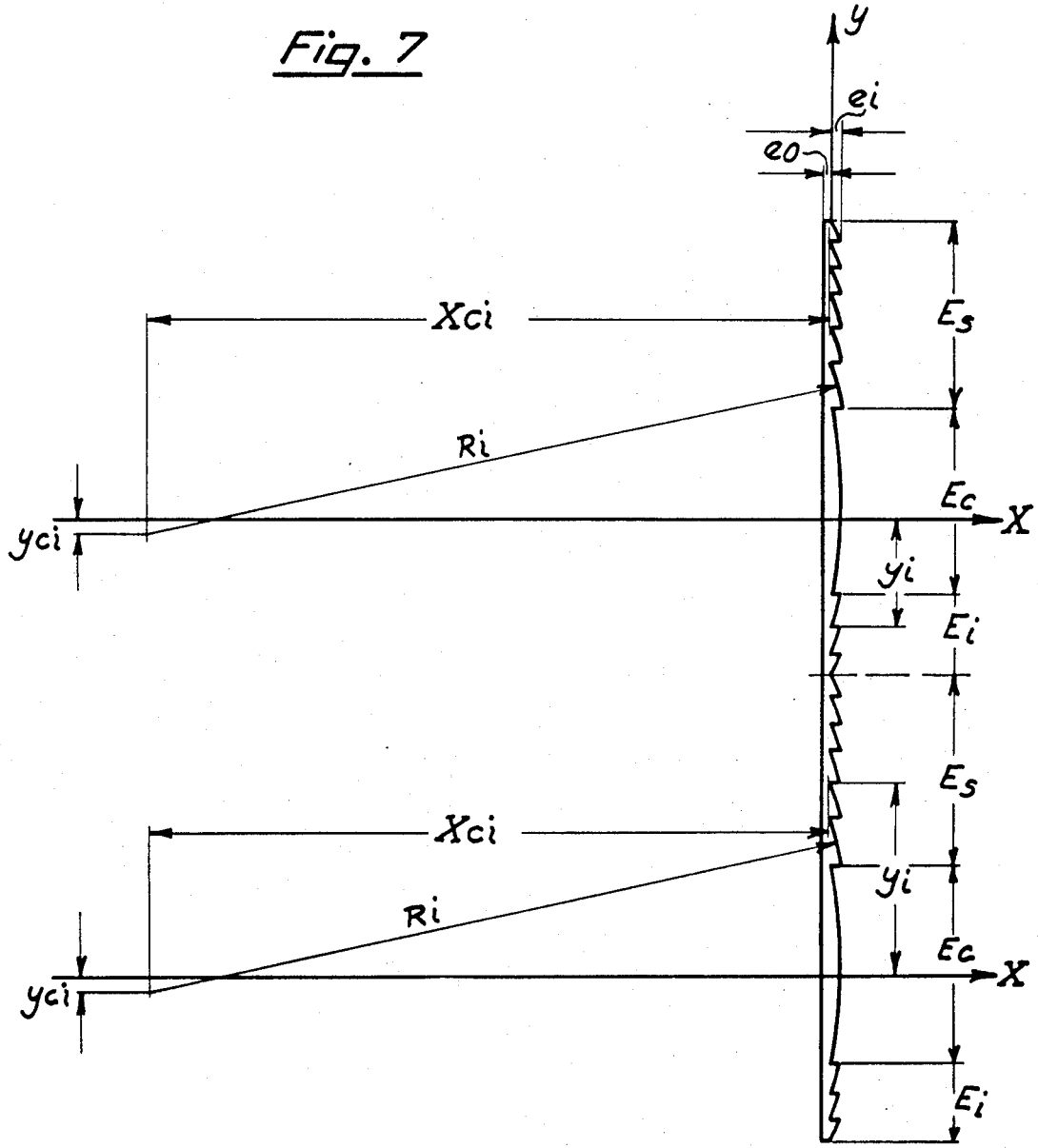

FIXED REFRACTOR OF ASYMMETRICAL PROFILE IDEAL FOR CONCENTRATING SOLAR ENERGY ON A SUITABLE COLLECTING SURFACE

BACKGROUND AND BRIEF SUMMARY OF THE INVENTION

The present invention relates to a special refractor, that is to say, a flat plate consisting of various flanked dioptric elements of transparent material with refractive index higher than 1, characterized by the fact that the elements making up the system have an afocal profile of asymmetrical geometry, whereby said refractor has the capacity, although remaining fixed with time, to concentrate the luminous rays of the solar source onto a surface of considerably smaller dimensions lying beneath the refractor.

This refractor represents considerable progress in its particular field.

The capacity of Fresnel type lenses to concentrate a beam of parallel rays towards its focal point has been well known for some time now. However, such a lens performs this function if it positioned so as always to remain at right angles with time to the incoming direction of the sun's rays.

For this purpose, the Fresnel lenses are mounted on so-called "tracking" or "sun follower" mechanisms which move the lens in an appropriate manner.

In fact, owing to the apparent movement of the sun, a fixed refractor of the concentrating type transmits a solar image which, over a period of time, assumes such dimensions so as to drastically compromise the possibility of collecting solar energy with a fixed absorber.

Also well known in the art are applications of said lenses in the utilization of solar energy, wherein they are mounted on sun follower mechanisms or else they can be fixed, but in this latter case, they are coupled to suitable elements designed to substitute the presence of the sun follower mechanisms.

The refractor in accordance with the invention has been devised as stated above, and succeeds in accomplishing a spatial concentration of the solar energy transmitted by keeping its position unaltered with time, even without the aid of additional elements for correcting the direction of the luminous rays refracted by the refractor profile.

More precisely, it has been found that, although the position and inclination of the refractor are kept fixed during the daily path of the sun across the sky in such a manner as to render the use of sun follower mechanisms unnecessary throughout the day, this refractor succeeds, at least for a period of 6 hours, in concentrating the solar energy striking said refractor, on to an absorber of considerably smaller dimensions than the exposed surface area, with a concentration ratio equal to or greater than 2.

For the concentration ratio in this case, we mean the ratio between width L of the refractor surface exposed to the sun and the corresponding dimension $L_1$ governing the surface struck by the solar image during the period of time considered.

Said profile can be advantageously used in harboring solar energy in the most suitable forms each time it is desirable to avoid the complication of having sun followers or systems for correcting the direction of the refracted rays, and when it required to transfer the energy striking a surface of arrestment to a collecting surface of smaller dimensions.

The refractor in accordance with the invention, as stated previously, consists of Fresnel type elements, either standard or modified version, said elements being made of any transparent material and arranged asymmetrically about a preselected axis as its profile does not allow an axial symmetry.

The so-designed profile does not have any single focal point as the elements making up the refractor do not have the same focal length along the axis of separation between the upper elements and the lower elements, that is to say, by keeping the refractor position fixed, a greater concentration of the sun's rays can be accomplished.

The central element, that is the element joining the respective refractor about the preselected axis, is afocal because the half elements comprising it, are of the flat-convex lens type with different focal points.

In fact, the central element actually consists of one single element formed by two different half lenses.

It has been found that by exposing said flat refractor to the sun's rays with suitable positioning of the profile with respect to the horizontal plane, transmissions of the solar image in the direction of the len's profile is such that there exists a plane in the half-gap opposite that of the incoming sun's rays, in which the incident solar energy is concentrated over an area considerably smaller than that of the collector profile.

It has also been found that said collecting area is always smaller than that which would be obtained using a conventional type Fresnel refractor of the same overall dimensions.

The lower concentrating power of the elements closer to the horizontal plane at ground level, with respect to that of the elements further away from the same horizontal plane, succeeds in limiting the excursion of the sun's rays on the collecting surface during the day.

When a refractor of symmetrical profile is used, for example, of the Fresnel type, it is possible, depending on the refractor design features, to find a plane in which the solar image strikes a surface area smaller than the area exposed to the sun over a considerable period of time. More specifically, when the angle formed by the axis of the refracted rays with the horizontal plane is such that the sun's rays strike the exposed surface perpendicularly at midday, then the width of the surface struck by the solar image during its movement is determined in the downwards direction by the rays refracted from the upper elements during the hours at the beginning and end of the time period considered, while the same direction upwards is determined by the same elements through the rays refracted at midday.

The asymmetrical profile, to which the herein disclosed invention refers, thanks to the higher dioptric power of the lower elements with respect to that of the upper elements, succeeds, while limiting the excursion of the rays refracted in downwards direction by the upper elements, in increasing the deviation of the rays refracted in the upwards direction by the lower elements. In this way, a considerably higher concentration ratio is obtained on the plane of maximum concentration with respect to that obtained on the plane of maximum concentration of a symmetrical refractor having the same overall dimensions as the asymmetrical refractor with which comparison is made.

For example, it was found when comparing a conventional Fresnel lens with a refractor of the herein disclosed type and of the same overall dimensions, that a concentration ratio of 1.59 is obtained on the plane of maximum concentration in the case of the Fresnel type lens, while for the asymmetrical refractor this concentration ratio was greater than 2.

The asymmetrical refractor can, in accordance with the required exposed surface and the solar image characteristics to be obtained, consist of an arbitrary number of upper and lower dioptric elements.

The profile of the various elements can be of the standard Fresnel type or be of a modified type.

A preferred embodiment of the refractor in accordance with the invention is illustrated in the accompanying drawings which are given as an exemplification of the principles of the invention, with no limitation to be inferred.

BRIEF DESCRIPTION OF THE DRAWINGS

More precisely:

FIG. 7 is a view of the profile in accordance with the invention, coupled to another identical profile.

DETAILED DESCRIPTION

Figure 1:
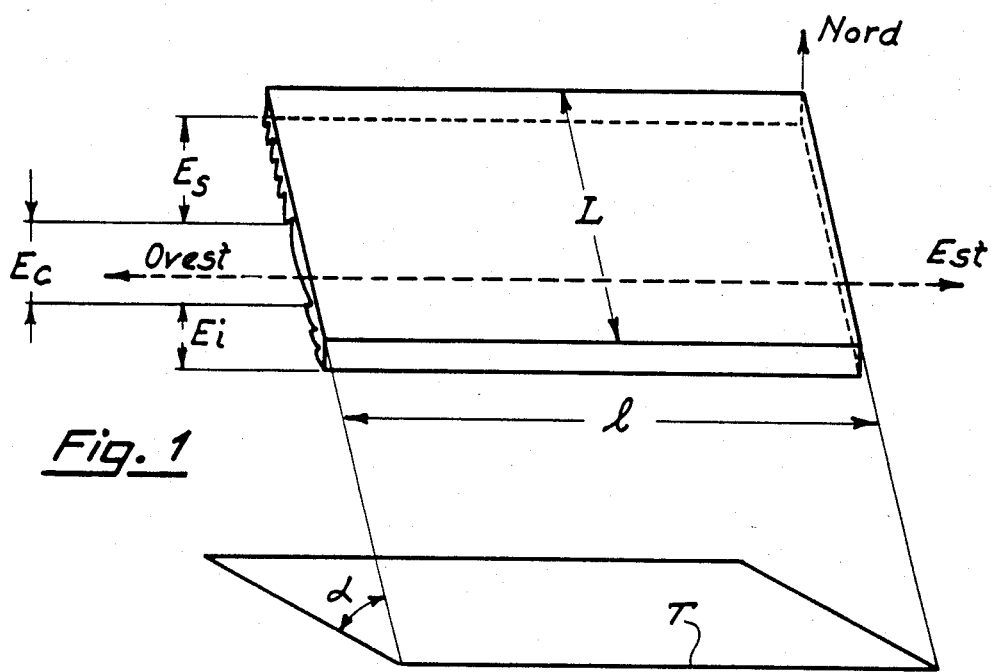
FIG. 1 is a scheme of the asymmetrical lens in accordance with the invention depicting prismatic elements.

With reference to the figures in the accompanying drawings, and for the sake of simplicity, the behavior of a profile in accordance with the invention, as illustrated in FIG. 1 was assumed to be taken into consideration.

The angle formed by the axis X of the refracted rays with the horizontal plane T is indicated by the letter $a$, while L designates the width of refractor R exposed to the sun.

The common thickness of the dioptric elements is indicated by the letters $ei$, while $eo$ instead denotes the thickness of the substrate of said elements.

The upper dioptric elements Es preferably making up the refractor in accordance with the invention are numbered from 1 to 6.

The central dioptric element is indicated by Ec and the lower dioptric elements by Ei.

The radius of curvature of a dioptric element is indicated by Ri while Xci and Yci indicate the co-ordinates of the central of curvature of said dioptric element.

The letters Yi instead denote the distance of axis X from the first lower dioptric element Ei and from the first upper dioptric element Es respectively.

The luminous rays A strike the plain or unprofiled surface of refractor R.

They are transmitted through the profiles of the various elements of differing inclinations. It was found that during the first and last hours of the time period 9.00 hours to 15.00 hours considered, and above all at exactly 9.00 hours and at exactly 15.00 hours, while the upper elements Es limit, with respect to axis X, the excursion of the solar image in the downwards direction, the lower elements Ei, thanks to their greater dioptric power succeed more efficiently in straightening the sun's rays in the upwards direction.

In the example considered, there was just one thickness $ei$ of the elements, but two distinct focal points were chosen, namely at 800 mm for the upper elements Es and at 400 mm for the lower elements Ei.

The focal point of a generic dioptric element, is taken to be the point of intersection of the refracted rays with axis X when the light strikes the exposed surface of the refractor at right angles.

Of course, when the dioptric elements consist of elements of the modified type such point will degenerate into a segment.

It has been found that the plane of maximum concentration lies in a position perpendicular to that of the profile (parallel to the plate) at a distance of 325.72 mm from the origin O of the axis X of separation between the upper elements and the lower elements.

Figure 2:
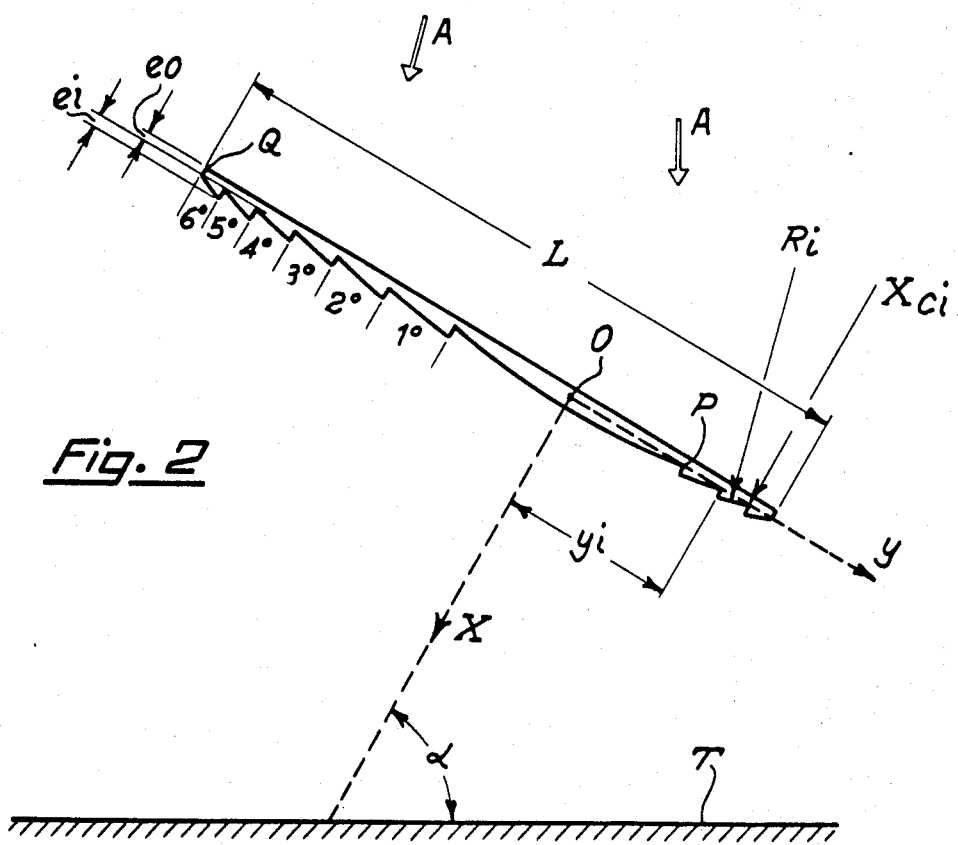
FIG. 2 is a view of the profile in accordance with the invention.
Figure 3:
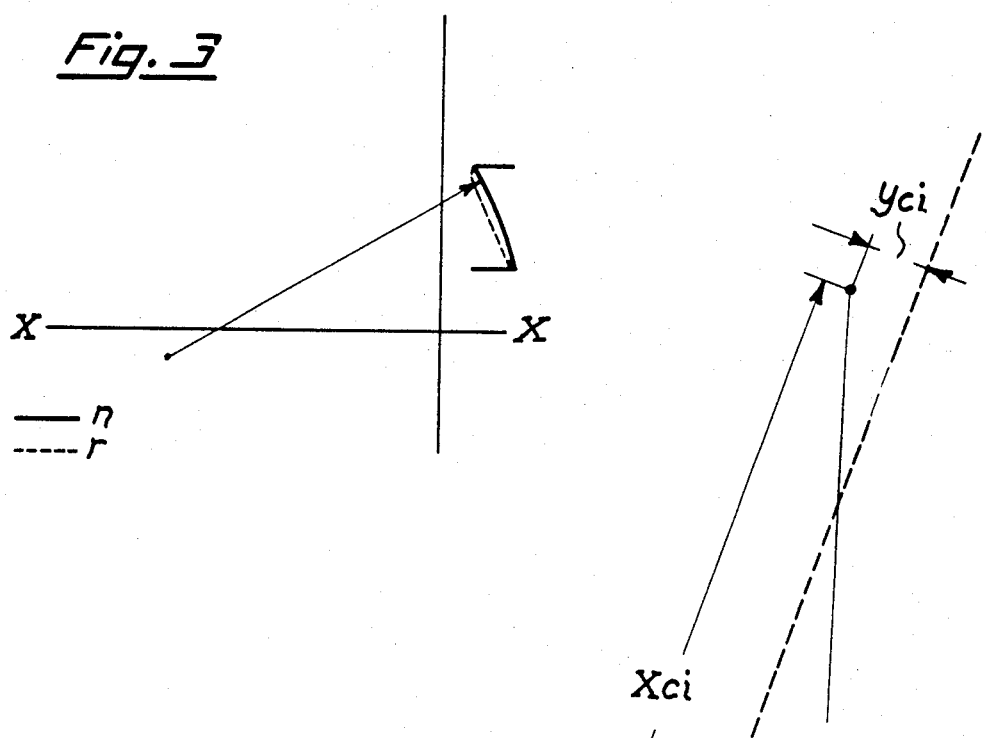
FIG. 3 shows a detail of the Fresnel profile, either standard or modified.

The maximum ordinate towards the top (y negative) (FIG. 6) reached on the collecting plane by the sun's rays is given by the ray refracted by the outermost end Q of the 6th upper element, while the minimum ordinate towards the bottom (y positive) is determined by the outermost end of the central element (denoted by the letter P in FIG. 2).

It is precisely the higher dioptric power of the lower elements Ei with respect to that of each of the upper elements Es which gives the asymmetrical refractor the capacity to determine, on a preselected plane, a smaller excursion of the solar image with respect to that obtained with a normal Fresnel lens.

In fact, in our example, the ratio between width L (FIG. 1) of the refractor and dimension $L_1$ (FIG. 6) within which takes place the maximum excursion of the solar image, is between 2 and 2.1.

Figure 4:
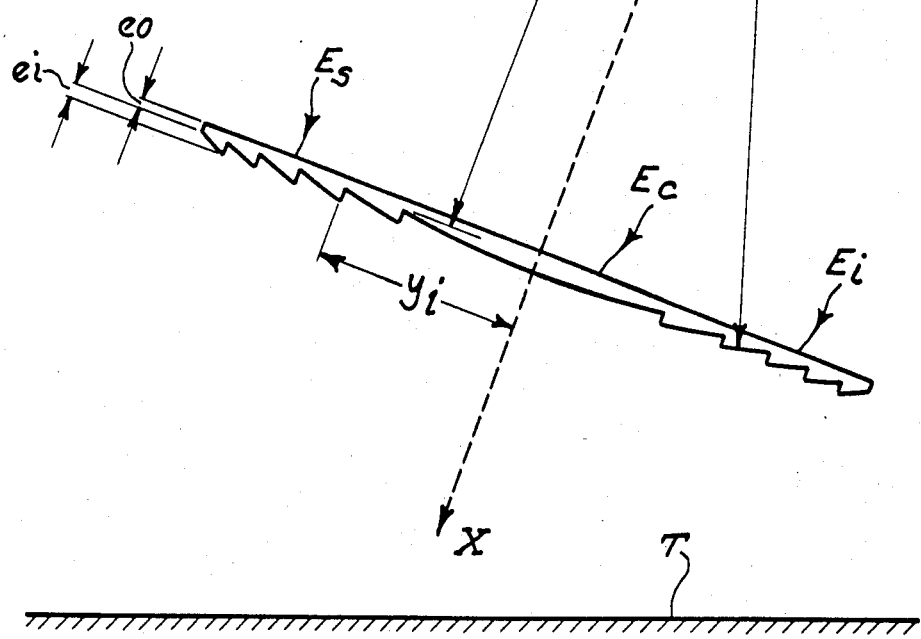
FIG. 4 is for the purposes of comparison a view of the profile of a conventional Fresnel type lens made up of various elements.

Suppose we had, instead, a conventional Fresnel lens as illustrated in FIG. 4 with a focal point lying at an intermediate distance between the two focal points of the two sets of elements (upper and lower) making up the lens as illustrated in FIGS. 1 and 2, we would also obtain a plane of minimum dispersion of the solar image, but the concentration ratio on said plane would be 1.6 and not at least 2 as in the case of the profile according to the invention.

The orientation of the profile in FIG. 1 is East-West in the longitudinal direction of the lens, while the plane of tilt with respect to the horizontal plane will depend on the latitude of the locality where the lens is to be used.

Figure 5:
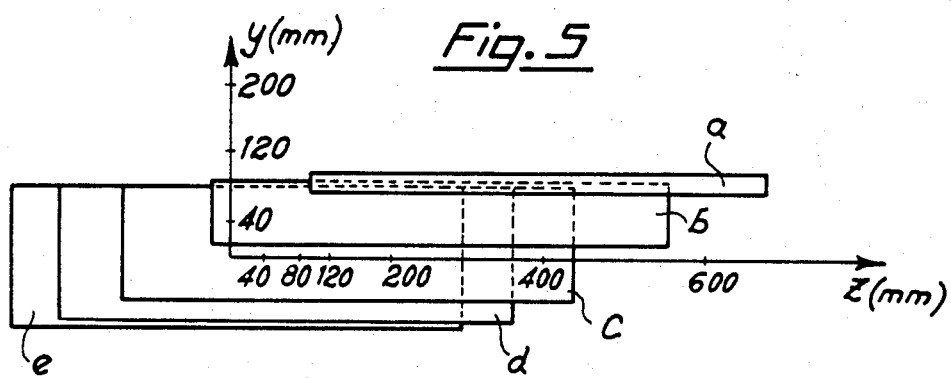
FIG. 5 shows the solar images on the plane of maximum concentration from 9.00 hours to 15.00 hours for the Fresnel lens.
Figure 6:
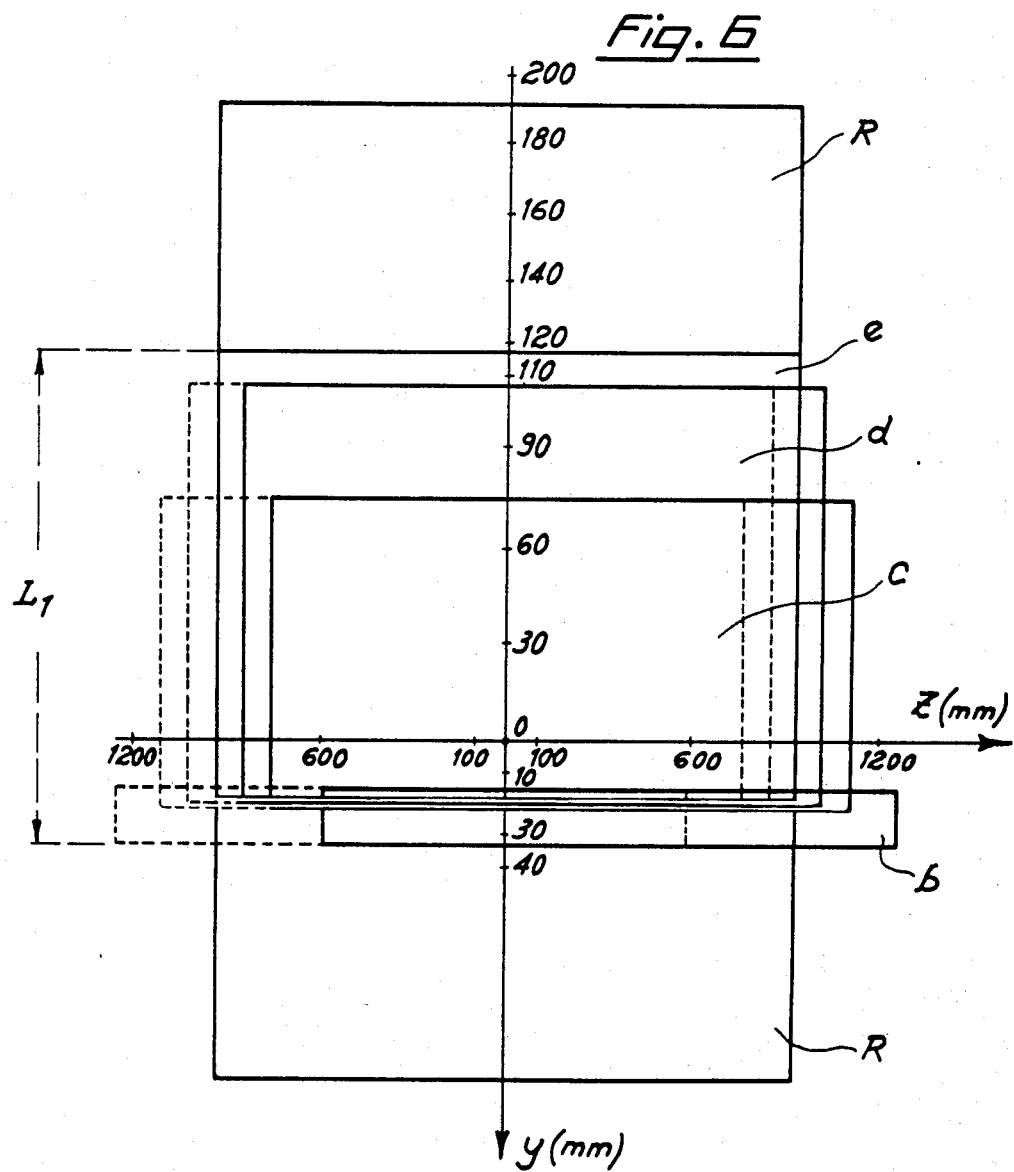
FIG. 6 represents the solar images transmitted by a profile like the one illustrated in FIG. 1 from 9.00 hours to 15.00 hours.

The refractors in FIGS. 5 and 6 are considered to be exposed perpendicularly to the sun's rays at 12.00 hours in the day of the summer solstice, at a latitude of 42° North.

Application of a refractor in accordance with the invention is not bound by the number, as several refractors can be used coupled together when deemed necessary (and as shown in FIG. 7 which limits, for the sake of simplicity, the coupling of the refractors according to the invention to a total of two).

To sum up, it should be emphasized that the refractor of asymmetrical profile can be made of any transparent material and can be of any dimensions; furthermore, thanks to its special concentrating power, the refractor possesses certain considerable advantages such as:

Fixed position both of the refractor and of the absorber.

Economy in the absorber design thanks to savings in materials and to the simplicity in construction.

Higher temperatures can be reached for any substance to be irradiated.

We claim:

1. A stationary optical longitudinal refractor for concentrating solar radiation which comprises a first group of prismatic elements on one side of a plane which is perpendicular to said refractor and a second group of prismatic elements on the other side of said plane, said first and second group of prismatic elements being made of a transparent material and being of such a form as to refract light rays passing through said first and second group of prismatic elements toward said plane, each of said prismatic elements having a different size and different power of refraction, said refractor being capable of concentrating solar energy striking it into an absorber of substantially smaller area than the exposed area of said refractor, with a sustained concentration ratio equal to or greater than 2.

2. The refractor according to claim 1 wherein said plane intersects said refractor on a line spaced from the center line dividing said refractor into two halves of equal width.

3. The refractor according to claim 1 wherein a central element is provided between said first and second prismatic elements and consists of two flat-convex half-lenses of different shapes and different focal lengths, said plane separating said two-half lenses from each other.

4. The refractor according to claim 1 wherein said first and second prismatic elements are of the same thickness.

5. The refractor according to claim 1 wherein each prismatic element has a different focal point, the focal point being defined as the point of intersection of the refracted rays with said plane, when said radiation strikes the refractor surface at right angles.

6. The refractor according to claim 5 wherein the focal point of said first group of prismatic elements is at 400 mm and said second group of prismatic elements is at 800 mm.

7. The refractor according to claim 1 wherein at least two of said refractors are positioned adjacent to each other.

8. The refractor according to claim 1 wherein the configuration thereof is such that the plane of maximum concentration of solar energy radiation is spaced by 325.72 mm from the refractor.

* * * * *